United States Patent [19]

Kumpf

[11] Patent Number: 5,074,527
[45] Date of Patent: Dec. 24, 1991

[54] DEVICE FOR RETROSPECTIVELY DRAWING CABLES INTO CABLE PROTECTION PIPES

[75] Inventor: Erich Kumpf, Esslingen, Fed. Rep. of Germany

[73] Assignee: Ursula Kumpf, Esslingen, Fed. Rep. of Germany

[21] Appl. No.: 439,362

[22] PCT Filed: Mar. 16, 1988

[86] PCT No.: PCT/EP88/00210
  § 371 Date: Nov. 16, 1989
  § 102(e) Date: Nov. 16, 1989

[87] PCT Pub. No.: WO88/07281
  PCT Pub. Date: Sep. 22, 1988

[30] Foreign Application Priority Data

Mar. 18, 1987 [DE] Fed. Rep. of Germany ... 8704051[U]

[51] Int. Cl.$^5$ .............................................. H02G 9/06
[52] U.S. Cl. ........................................ 254/134.3 FT
[58] Field of Search ............... 254/134.3 FT, 134.3 R; 15/104.35 N; 174/135

[56] References Cited

FOREIGN PATENT DOCUMENTS

| 3217401 | 11/1983 | Fed. Rep. of Germany ... 254/134.3 FT |
| 8704051 | 3/1987 | Fed. Rep. of Germany ... 254/134.3 FT |
| WO86/283 | 6/1985 | World Int. Prop. O. ....... 254/134.3 FT |

Primary Examiner—Robert C. Watson
Attorney, Agent, or Firm—Jones, Tullar & Cooper

[57] ABSTRACT

A device for retrospectively drawing cables into cable protection pipes which are already provided with at least one cable. The device includes an elongated partition floor inserted into the protection pipes. The partition has a central region having an upper and a lower surface. On both sides of the partition, transverse to the central region, there is provided a hollow tubular longitudinal edge which determines the level of the partition floor in the protection pipes. The central region is provided at at least one of the upper and lower surfaces with at least one reinforcing rib extending in the longitudinal direction of the partition floor.

6 Claims, 2 Drawing Sheets

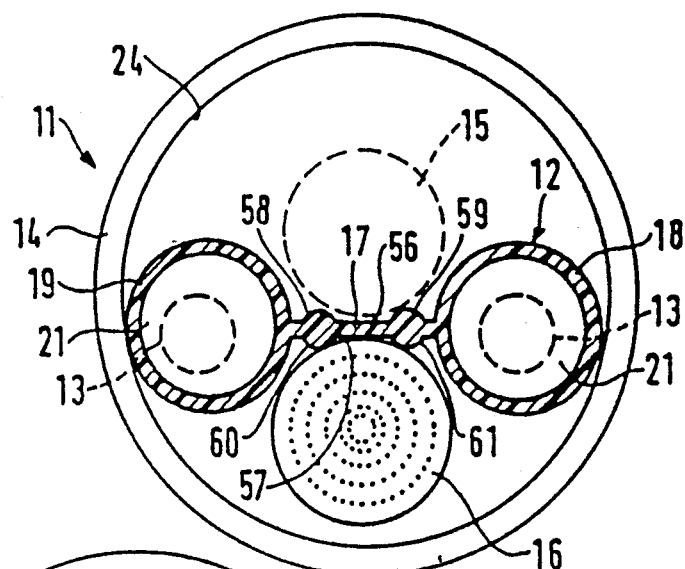
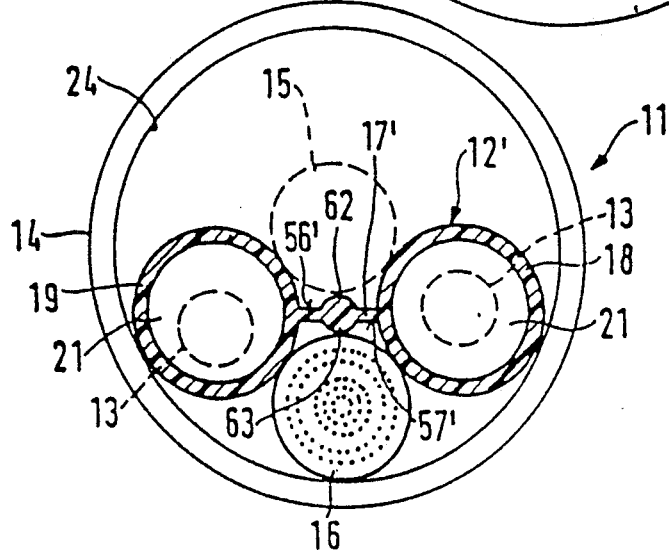
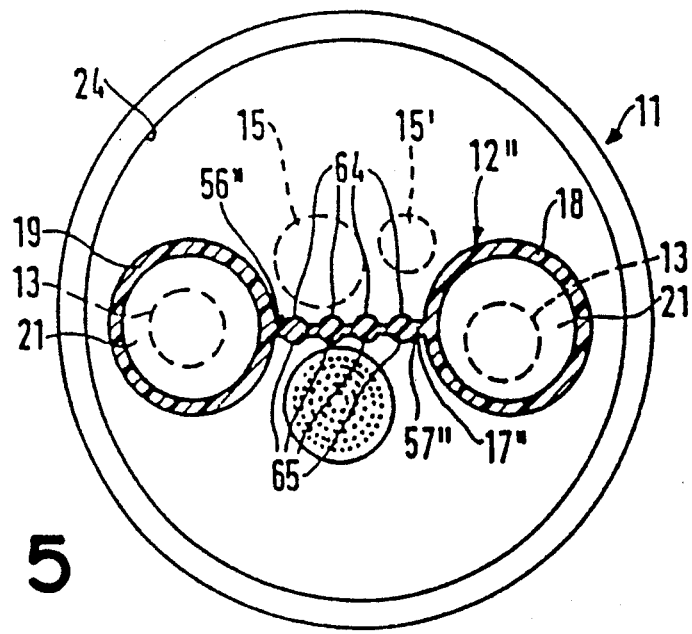

DEVICE FOR RETROSPECTIVELY DRAWING CABLES INTO CABLE PROTECTION PIPES

BACKGROUND OF THE INVENTION

The present invention relates to a device for retrospectively drawing cables into cable protection pipes, which are already provided with at least one cable, including a partition floor which may be inserted into the protection pipe and which is provided on both sides of its central region with a hollow tubular longitudinal edge which determines its level.

In one such device which is disclosed in German Patent Specification No. 34 27 788 the central region of the partition floor is flat on both surfaces thereof, and therefore has a uniform thickness along its cross-section. In practice during insertion it has been shown that because of the increasing friction between the forward region of the partition floor which is within the cable protection pipe, and the internal walls of the cable protection pipe or the previously laid cable, that region of the partition floor which is subsequently inserted buckles under the increasing pressure towards the forward end of the cable protection pipe, and after a further increase in pressure the buckle collapses towards the front of the partition floor, then a further buckle forms, which then collapses again, etc. This buckling insertion, which is attributable to the insufficient rigidity of the partition floor for this purpose, has the disadvantage however, that firstly insertion cannot be carried out continuously and that secondly the friction between the partition floor and the cable protection pipe or the cable contained therein is further increased. It would therefore appear to be worthwhile to further reduce the friction between the partition floor and the inner wall of the cable protection pipe as well as between the partition floor and the cable lying therein.

SUMMARY OF THE INVENTION

The object of the present invention is to provide a device for retrospectively drawing a cable into a cable protection pipe of the type mentioned above, in which, as a result of reduced friction between the partition floor and the cable protection pipe internal wall or the cable already provided in the cable protection pipe, the partition floor can be inserted in longer strokes in a simpler and more continuous manner.

This object is achieved in a device for retrospectively drawing cables into a cable protection pipe of the type mentioned above, in that the central region of the partition floor is provided at its upper and/or lower surfaces with at least one reinforcing rib extending in the longitudinal direction of the partition floor.

The provision of reinforcing ribs increases the longitudinal rigidity of the partition floor such that the aforementioned buckling engagement of the partition floor when the friction between the partition floor and the cable protection pipe or the cable contained therein is too high, is avoided, and also the consequent additional friction because of the additional contact area between the partition floor and the cable protection pipe is avoided. Furthermore, the contact area between the partition floor and any cable which is lying in a somewhat undulating manner in the cable protection pipe is thus reduced to a minimum, so that in this way also the friction which must be overcome during insertion is reduced to a minimum. Also, the greasing effected to reduce friction between the partition floor and the previously laid cable can be restricted to narrow areas. In this regard, advantages are also presented in the case of pulling through an additional cable over the partition floor after the latter has been inserted.

When the reinforcing ribs on the upper surface and those on the lower surface of the central region of the partition floor are arranged in pairs lying directly opposite one another, an arrangement results which is symmetric about a central plane, which has the advantage that the partition floor can be inserted in any orientation.

When a pair of reinforcing ribs are arranged centrally in the central region of the partition floor the two hollow tubular longitudinal edges lie relatively close to one another, the cable already in the cable protection pipe, if of relatively large diameter, cannot jam between the hollow tubular longitudinal edges, and in this way there is avoided a possible increase in friction. The same applies to the cable to be subsequently pulled along the partition floor.

In many instances it is advantageous in a device of the type mentioned to provide two parallel pairs of reinforcing ribs arranged on the central region of the partition floor with a gap between them greater than the gap between each of them and the corresponding hollow tubular shaped tube edges, that is to say, in particular when the central region is relatively wide.

For cables of relatively small diameter which have already been laid in the cable protection pipe and/or cables which are to be pulled through and which are of relatively small diameter, it may be advantageous to provide a large number of pairs of reinforcing ribs distributed evenly over the width of the central region of the partition floor. This is advantageous even in the case of a very wide central region.

The height of the reinforcing ribs may be at least about the same as the thickness of the central region, but more advantageously, the height may be about 2 to 3 mm, when the central region has a thickness of about 1.5 mm. The cross sectional shape of the reinforcing ribs may be selected to be approximately semi-circular in cross section. It is also possible, however, to provide reinforcing ribs which are bevelled and which are triangular in cross section.

BRIEF DESCRIPTION OF THE DRAWINGS

Further details of the invention may be learned from the description which follows in which the invention is described and explained in more detail with reference to the embodiments illustrated, which is the drawings. These show.

DETAILED DESCRIPTION OF THE PREFERRED EMBODIMENTS

Figure 1:
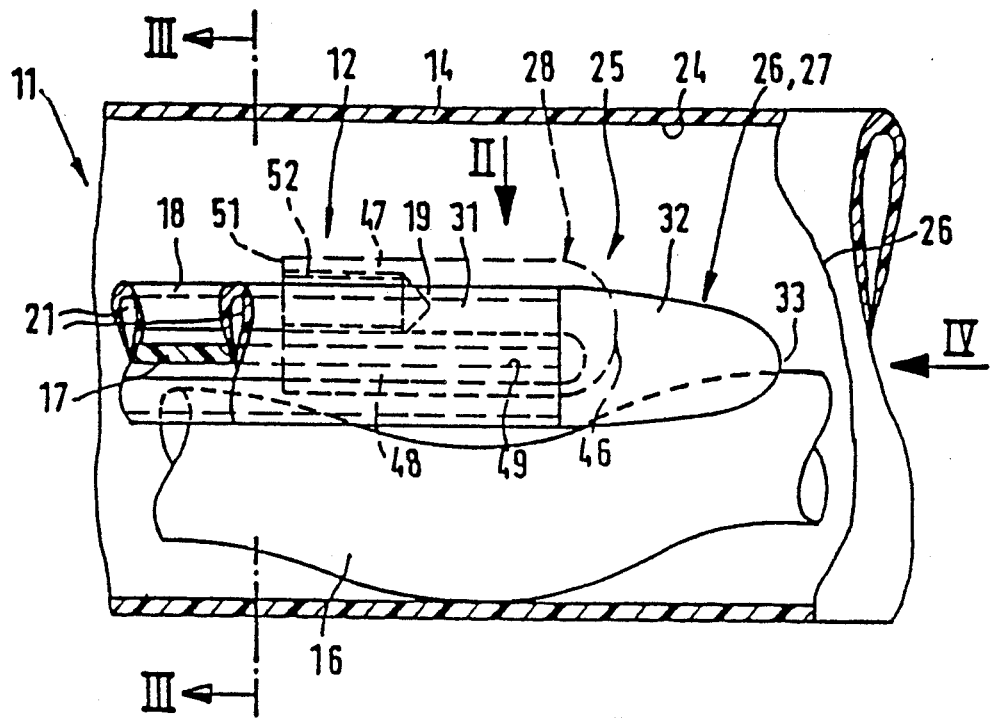
FIG. 1 in a partially cut away side view, a device for retrospectively laying cables in a cable protection pipe according to a first embodiment of the present invention, FIG. 2 which is a plan view of the device according to the invention, along arrow II of FIG. 1, and shown partially cut away, FIG. 3, which is a section on line III—III of FIG. 1, FIG. 4, which is a section similar to that of FIG. 3, but of a second embodiment of the present invention and FIG. 5, which is a section similar to that of FIG. 3, but of a third embodiment of the present invention.
Figure 2:
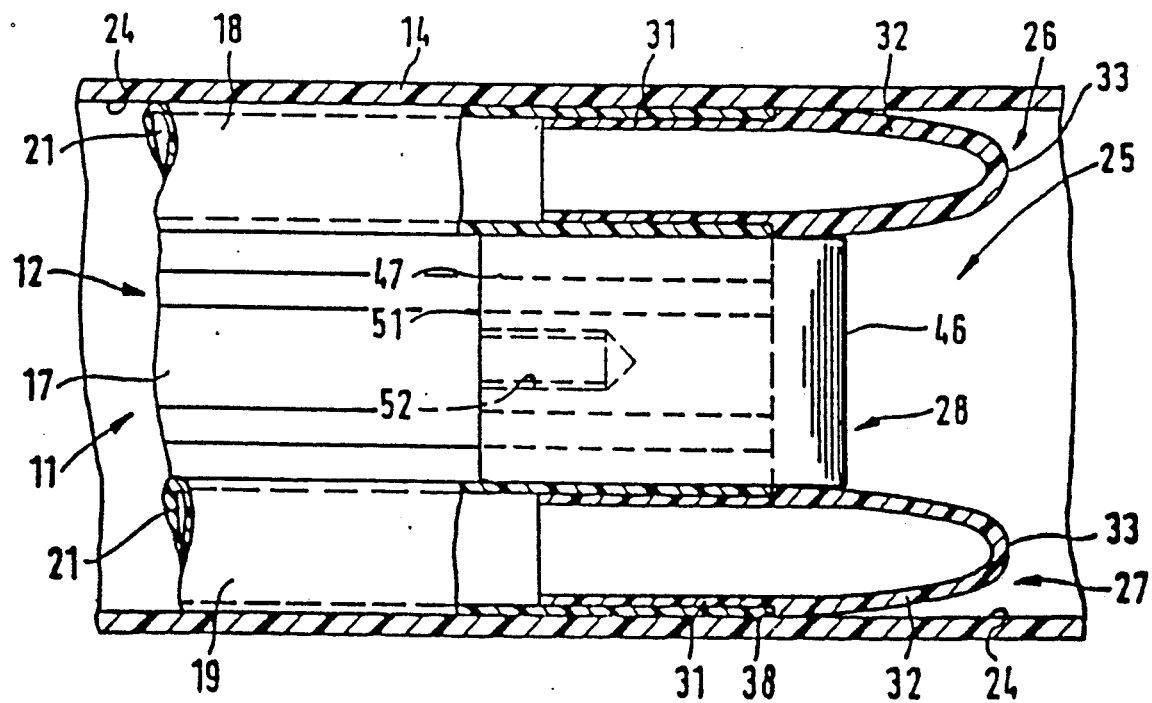

The device 11 according to the invention serves for the preparation for retrospectively drawing into, and also for the retrospective drawing into or laying of one or more further electrical and/or optical cables 15, 13, in a cable protection pipe 14 made of plastic material, or of earthenware pipes or of other material, which is laid in the ground and already contains an electrical cable 16, which lies on the floor of the protection pipe 14. The protection pipe 14 which is generally assembled from a number of sections, runs between two access stations, is generally used in the laying of, for example, telephone cables but also energy cables, and in terms of its diameter is substantially greater than the cable 16 itself, so that there still remains sufficient space inside the protection pipe 14 for the laying or drawing in of further cables. For this purpose the device 11 uses a partition floor 12, which may be drawn into the previously laid cable protection pipe 14 by insertion, and on which the one or more further cables 15 may be laid. The partition floor 12 has on both sides of the central region 17, that is on both of its long side edges, tubes 18 and 19 respectively, which have a hollow circular cross sectional cavity 21 extending along their entire length, into each of which at least one further and preferably optical cable 13 can be drawn.

The partition floor 12, which serves to spatially separate and also, in some cases, to electrically separate the previously laid cable 16 on the one hand and the retrospectively laid cable 15, 13 on the other hand, is made for example from a transversely stiff plastic material, such as polyamide, polyester or hard P.V.C.

The partition floor 12 is integrally formed, for example extruded, and comprises, as mentioned above, a strip shaped central region 17, to the two longitudinal edges of which the tubes 18, 19 are connected, which have a circular cross sectional cavity 21 extending along their full length. In spite of the transverse rigidity of the partition floor 12, this is preferably longitudinally flexible, so that it may be coiled, that is to say may be taken up on a drum so that it may be cut off accordingly after completion of insertion in the cable protection pipe 14.

The strip-shaped central region 17 comprises, according to FIG. 3, on its upper side 56 as well as on its lower side 57, along its entire length, two mutually parallel reinforcing ribs 58, 59 and 60, 61 respectively. The distance between the parallel reinforcing ribs 58, 60 and 59, 61 is greater than each of their respective distances from the corresponding tubes 18 and 19 respectively. The reinforcing ribs 58 and 60 and 59 and 61 are each arranged directly opposite one another and are integrally formed, or extruded, with the central region 17 or the entire partition floor 12. The reinforcing ribs 58 to 61 as shown in the illustrated embodiment have a semi-circular cross section, but it should be understood that they may have other shapes, for example triangular in cross section and with a flattened apex. The thickness of the reinforcing ribs 58 to 61 is in the interval between the single and the double thickness of the central region 17.

FIG. 4 shows, in accordance with another embodiment of the present invention, that the central region 17' of the partition floor 12' is provided on its upper side 56' and on its lower side 57' with a single centrally located reinforcing rib 62' and 63' respectively. This is advantageous where, because the central region 17' is relatively narrow, the two tubes 18 and 19 lie closer together than in the embodiment of FIG. 3.

FIG. 5 shows an embodiment comprising a partition floor 12", the central region 17" of which is relatively wide and which is provided with a large number of reinforcing ribs 64 and 65, which lie in pairs opposite one another and follow one another in sequence at short sideways intervals.

As is shown in the drawings, the full width of the partition floor 12, 12' or 12" respectively is at most equal to but is generally less than the internal diameter of the already laid cable protection pipe 14, so that the hollow tubular longitudinal edges 18, 19 also determine the clearance of the partition floor 12, 12' or 12" during insertion in the protection pipe 14. This also allows the height of the partition floor 12, 12', 12" to change within the cable protection pipe 14, depending on where the previously laid cable 16 lies. In FIGS. 3 to 5 the partition floor 12, 12', 12" lies with its longitudinal edges 18, 19 on the internal wall of the cable protection pipe 14 above or below the longitudinal central plane and/or the cable 16 which was already laid in the cable protection pipe 14.

The internal diameter of the hollow tubes, or hollow tubular shaped longitudinal edges 18, 19, which are advantageously of the same diameter, is large enough to receive at least one further cable, for example in the form of a relatively thin optical cable 13. An optical or glass fiber cable 13 of this type, can be either laid in the partition floor 12, 12' or 12" which is to be inserted, or can be subsequently pulled through by means of a previously laid towing line.

The device 11 according to the invention consists of, in addition to the partition floor 12, 12', 12", the clearance of which is determined by the tubes 18, 19, a cable guide 25 which serves such that when during insertion of the partition floor 12 the latter and the previously laid cable 16 come towards one another, then, either the cable 16 is pushed downwardly or the partition floor 12 yields obliquely and/or is pushed upwardly and in this way the previously laid cable 16 is not damaged. The cable guide 25 which is preferably of plastic material consists in this case of three parts, namely head elements 26, 27 for insertion in each hollow tube 18, 19 and a guide element 28 which may be fitted over the central region 17 of the partition floor 12. The two head elements 26 and 27, which are closed at one end and are hollow, and are of the same construction as one another, each comprises two regions, namely a rear externally cylindrical region 31 and an integrally formed externally conical region 32 connectable thereto, the smallest diameter of which constitutes the forward closed and rounded end 33. The external diameter of the cylindrical region 31 corresponds to the internal diameter of the tubes 18, 19, so that it can be inserted in these. The forward conical region 32 is connected by means of an annular shoulder 38 to the rear region 31. The width of the annular shoulder 38 corresponds to the wall thickness of the tubes 18, 19.

The guide element 28, which is likewise of plastic material, is in the shape of a reclining U, and therefore is rounded at its forward free end 46 and has a width corresponding to that of the central region 17 of the partition floor 12. The gap 49 between the two limbs 47 and 48 of the U has a clearance which is the same as or is somewhat less than the thickness of the central region 17 including the reinforcing ribs 58 to 65. It is also possible to provide a gap 49 having a clearance corresponding basically to the thickness of the central region 17 without ribbing, and to provide in the two limbs 48 and 49 grooves for receiving the engaging reinforcing ribs 58 to 65. In this way the central region 17 of the partition floor 12 can be received as a frictional fit in the gap 49. In the construction shown in FIG. 1 the upper limb 47 is made thicker than the lower limb 48 and is provided at that end 51 which is further from the insertion end of the partition floor 12, with a threaded bore 52 into which a corresponding threaded element may be screwed in a manner which is not shown, which may for example be connected to a towing line or the like, so that this towing line may be pulled into the cable protection pipe 14 simultaneously with the partition floor 12.

The retrospective insertion of the partition floor in a cable protection pipe 14 laid in the ground, in which a cable 16 is already laid, is effected by inserting the partition floor 12, 12' or 12" provided at its front end with a cable guide 25, with the help of a drive device or with short strokes of the hand, the cable guide 25 sliding along the internal wall 24 of the cable protection pipe and over the already laid cable 16, and possibly pushing the latter to one side or another in the direction of the protection pipe floor or itself yielding in an oblique manner. The partition floor 12, 12', 12" moves correspondingly into the protection pipe 14, that is it slides along the protection pipe internal wall 24 and disposes itself corresponding to the disposition of the cable guide 25. It does not matter here whether the cable guide 25, or the partition floor 12, is exactly horizontal as shown in the drawings or extends obliquely in one direction or the other, that is to say is disposed in an inclined manner within the protection pipe 14, as in this context the term "partition floor" includes also the term "partition wall" when in an extreme case the cable guide 25 and/or the partition floor 12 is inclined or is upright. Because the partition floor 12 is flexible, the disposition is determined by the disposition of the previously laid cable 16 in the protection pipe 14. Due to the arrangement of the reinforcing ribs 58 to 65 a certain definite rigidity is furthermore given in the longitudinal direction, so that even when the friction is relatively large, the partition floor 12, 12', 12" does not stop in the cable protection pipe 14.

I claim:

1. A device for retrospectively drawing cables into cable protection pipes which are already provided with at least one cable, including:

an elongated partition floor inserted into the protection pipes, which has a central region having an upper and lower surface, and is provided on both sides transverse to the central region with a hollow tubular longitudinal edge which determines its level in the protection pipes, wherein the central region is provided with a reinforcing rib on each surface of the central region extending in the longitudinal direction of the partition floor, and wherein both reinforcing ribs are located at the center of the central region.

2. A device for retrospectively drawing cables into cable protection pipes which are already provided with at least one cable, including:

an elongated partition floor inserted into the protection pipes, which has a central region having an upper and lower surface, and is provided on both sides transverse to the central region with a hollow tubular longitudinal edge which determines its level in the protection pipes, wherein at least one pair of reinforcing ribs are provided on each surface of the central region extending in the longitudinal direction of the partition floor, said pairs of reinforcing ribs being directly opposite to one another, and wherein the gap between the reinforcing ribs of each pair is greater than the gap between each reinforcing rib and its corresponding hollow tubular longitudinal edge.

3. The device as defined in claim 2, wherein each reinforcing rib has a height which is at least equal to the thickness of the central region.

4. The device as defined in claim 2, wherein each reinforcing rib is approximately semi-circular in cross section.

5. The device as defined in claim 1, wherein each reinforcing rib has a height which is at least equal to the thickness of the central region.

6. The device as defined in claim 1, wherein each reinforcing rib is approximately semi-circular in cross section.

* * * * *